(12) United States Patent
Lisiak (10) Patent No.: US 10,816,419 B2
(45) Date of Patent: Oct. 27, 2020

(54) TRIPEDAL FLEXURE MEMBER AND LOAD/TORQUE MEASUREMENT SYSTEMS USING SAME

(71) Applicant: FUTEK Advanced Sensor Technology, Irvine, CA (US)

(72) Inventor: Maciej Lisiak, San Clemente, CA (US)

(73) Assignee: FUTEK Advanced Sensor Technology, Irvine, CA (US)

( * ) Notice: Subject to any disclaimer, the term of this patent is extended or adjusted under 35 U.S.C. 154(b) by 168 days.

(21) Appl. No.: 16/257,541

(22) Filed: Jan. 25, 2019

(65) Prior Publication Data

US 2020/0240858 A1 Jul. 30, 2020

(51) Int. Cl.
*G01G 3/14* (2006.01)
*G01L 1/22* (2006.01)

(52) U.S. Cl.
CPC .......... *G01L 1/2243* (2013.01); *G01G 3/1412* (2013.01)

(58) Field of Classification Search
CPC .............................. G01L 1/2243; G01G 3/1412
USPC .......................................................... 177/211
See application file for complete search history.

(56) References Cited

U.S. PATENT DOCUMENTS

| 3,695,096 | A | 10/1972 | Kutsay |
| 4,711,314 | A | 12/1987 | Suzuki et al. |
| 5,121,989 | A | 6/1992 | Horton et al. |
| 6,417,466 | B2 | 7/2002 | Gross et al. |
| 6,504,114 | B1 | 1/2003 | Lockery et al. |
| 6,555,767 | B1 | 4/2003 | Lockery et al. |
| 6,633,008 | B2 * | 10/2003 | Johnson ................... G01G 3/13 177/184 |
| 6,694,829 | B2 | 2/2004 | Chimura et al. |
| 8,561,482 | B2 * | 10/2013 | Aumard ................. G01G 21/30 73/862.627 |
| 9,255,832 | B2 * | 2/2016 | Schmittner ............... G01L 1/26 |

FOREIGN PATENT DOCUMENTS

| CN | 105486297 | * | 4/2016 | ......... G01C 19/5656 |
| EP | 0634006 | B1 | 2/1998 | |
| JP | 2695291 | B2 * | 12/1997 | ............... G01G 3/12 |

* cited by examiner

*Primary Examiner* — Jacques M Saint Surin
(74) *Attorney, Agent, or Firm* — Young Basile Hanlon & MacFarlane, P.C.

(57) ABSTRACT

A flexure structure comprising the unitary combination of three modified S-shaped beams arranged in parallel and sharing common top and bottom structures. The outside beams are oriented alike in one direction while the inside or center beam is oriented in the opposite direction. The outside edge surfaces of the beams are flat and are instrumented with strain sensors connected in bridge circuits.

11 Claims, 12 Drawing Sheets

| DESCRIPTION | Tx | Cx | Ty | Cy |
|---|---|---|---|---|
| PRIMARY BEAM SINGLE SIDED (SIDE 1) | T1 | C1 | T2 | C2 |
| | T1 | C2 | T2 | C1 |
| | T2 | C1 | T1 | C2 |
| | T2 | C2 | T1 | C1 |
| PRIMARY BEAM SINGLE SIDED (SIDE 2) | T3 | C3 | T4 | C4 |
| | T3 | C4 | T4 | C3 |
| | T4 | C4 | T3 | C3 |
| | T4 | C3 | T3 | C4 |

Full Bridge Schematic 1

FIG. 11A

Full Bridge Schematic 2

FIG. 11B

Full Bridge Schematic 3

FIG. 11C

Full Bridge Schematic 4

TRIPEDAL FLEXURE MEMBER AND LOAD/TORQUE MEASUREMENT SYSTEMS USING SAME

FIELD OF THE INVENTION

This disclosure pertains to flexure structures for use in load cells and other force measurement applications, and more particularly to a novel "tripedal" flexure consisting of the integral combination of three substantially S-shaped flexure beams arranged in parallel but cooperatively joined only by integral top and bottom structures, wherein the inward S-openings of the two outside flexure beams are oriented in the same direction while the inward S-openings of the center flexure beam are oriented in the opposite direction. The surfaces of the beams can be instrumented with strain gages in various combinations for measuring tension, compression or torsional forces and/or combinations thereof.

BRIEF SUMMARY OF THE INVENTION

The present invention, according to a first aspect, is a tripedal flexure comprising three substantially S-shaped flexure beams arranged in parallel, spaced apart relationship but integrally joined at the top and bottom by structures that permit load quantities such as compression forces, tension forces and/or torque to be applied to the flexure. Strain sensing elements such as variable-resistance strain-gages may be applied by any of various methods to surfaces of the beams in various arrangements.

By way of example, the center beam may be instrumented alone to measure tension and/or compression forces. Alternatively, the side beams can be instrumented to measure torque. As a further alternative, all of the beams can be instrumented to measure torque, compression and/or tension forces and/or combinations thereof.

In accordance with an illustrative embodiment hereinafter described, all of the flexure beams assume a "modified S-shape" in that they all have rounded inwardly curved edge surfaces and flat, planar outside edge surfaces. In theory either internal curved surfaces of the beam, or its external flat surface can be used for instrumentation with strain gauges, but it the flat outside edge surfaces are preferred from a manufacturing stand point to have strain gages or other strain-responsive devices affixed. The beams also have planar and parallel side faces with narrow spacings between them.

The entire flexure can be and preferably is manufactured from a single piece of elastically formable metal stock such as Inconel, stainless steel and aluminum and can be variously sized to accommodate various load ranges extending, by way of example from 100 gram to 1 k pounds. Exemplary dimensions for very small or "nano" flexures are provided hereinafter.

The strain-sensitive elements may be applied using state-of-the-art techniques such as bonding, depositing, and/or printing. These elements are typically variable resistors and are connected in bridge circuits in conventional fashion to produce output signals in the form of variable voltages.

BRIEF DESCRIPTION OF THE DRAWING

The flexure element is disclosed herein with respect to a single representative physical configuration and is further represented in the figures in various operating modes and with various strain gage instrumentation arrangements. The figures are as follows.

DETAILED DESCRIPTION OF THE ILLUSTRATIVE EMBODIMENT

Figure 1:
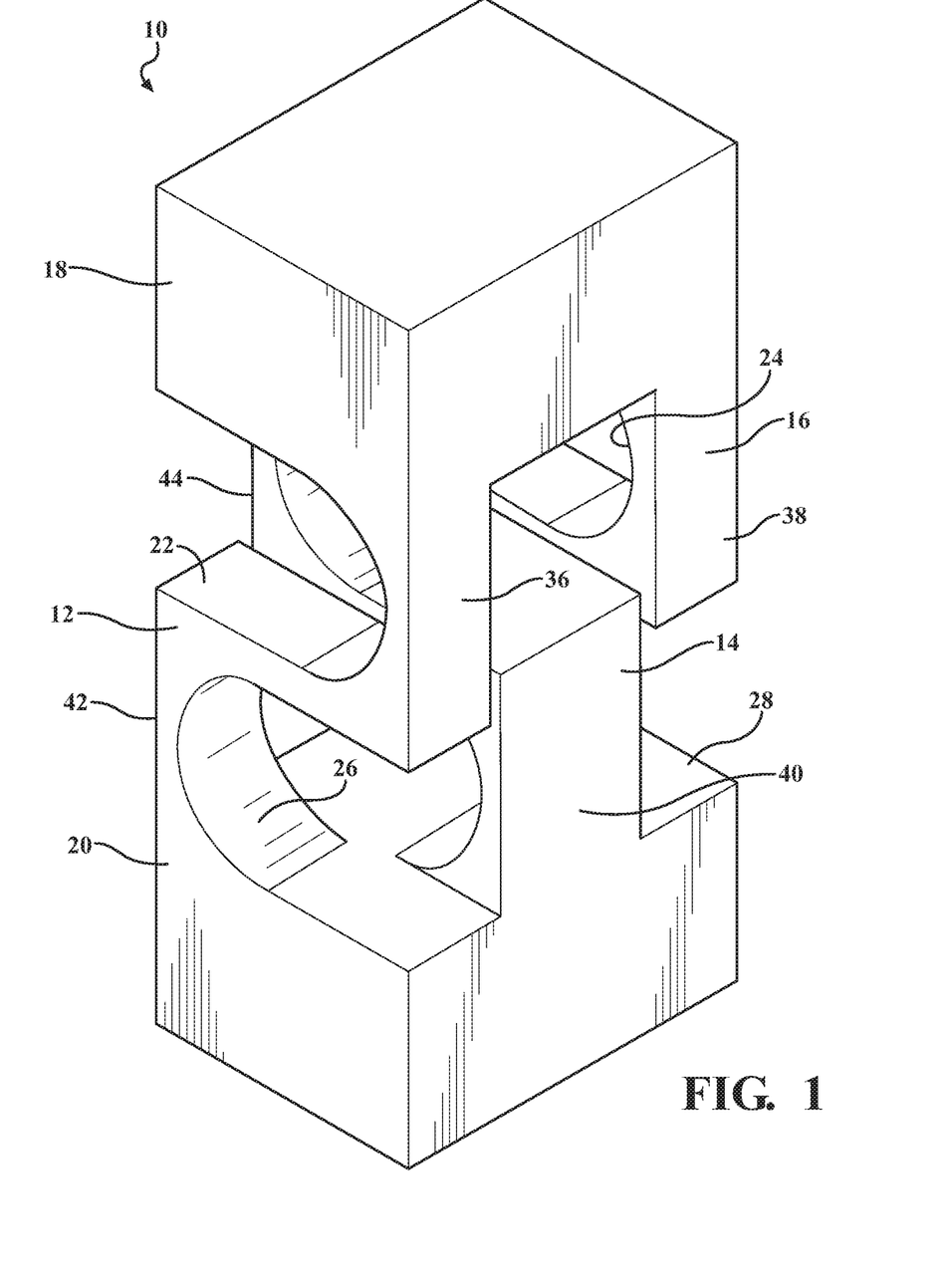
FIG. 1 is a perspective view of an illustrative tripedal flexure.
Figure 2:
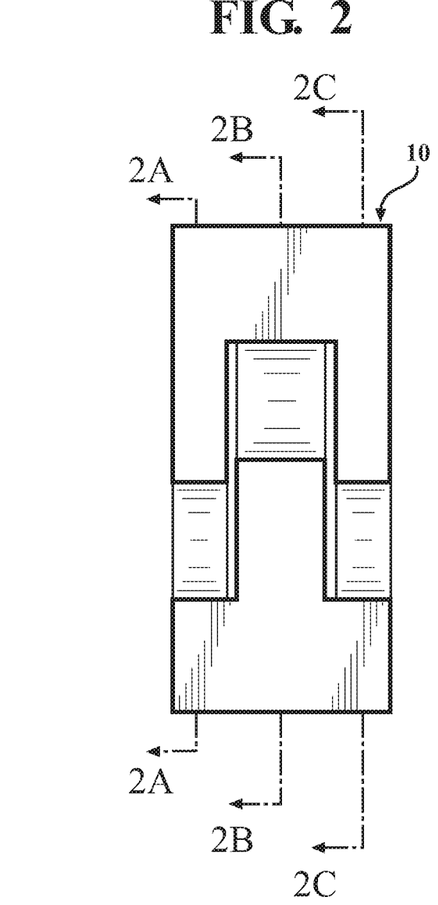
FIG. 2 is a side view of the flexure shown in FIG. 1
Figure 2A:
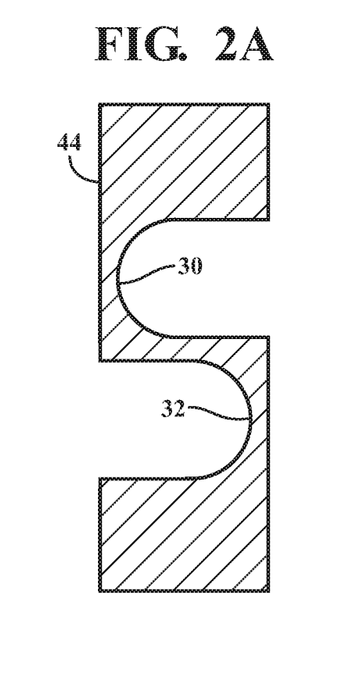
FIG. 2A is a side sectional view along a section line 2A-2A in FIG. 2.
Figure 2B:
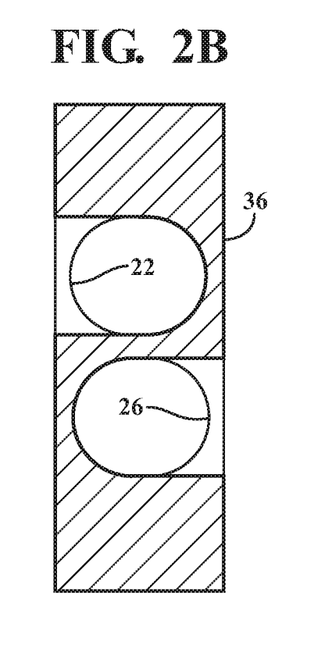
FIG. 2B is a side sectional view along a section line 2B-2B in FIG. 2'
Figure 2C:
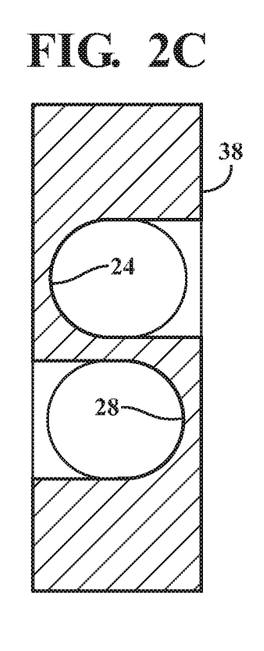
FIG. 2C is a side sectional view along a section line 2C-2C in FIG. 2.
Figure 3:
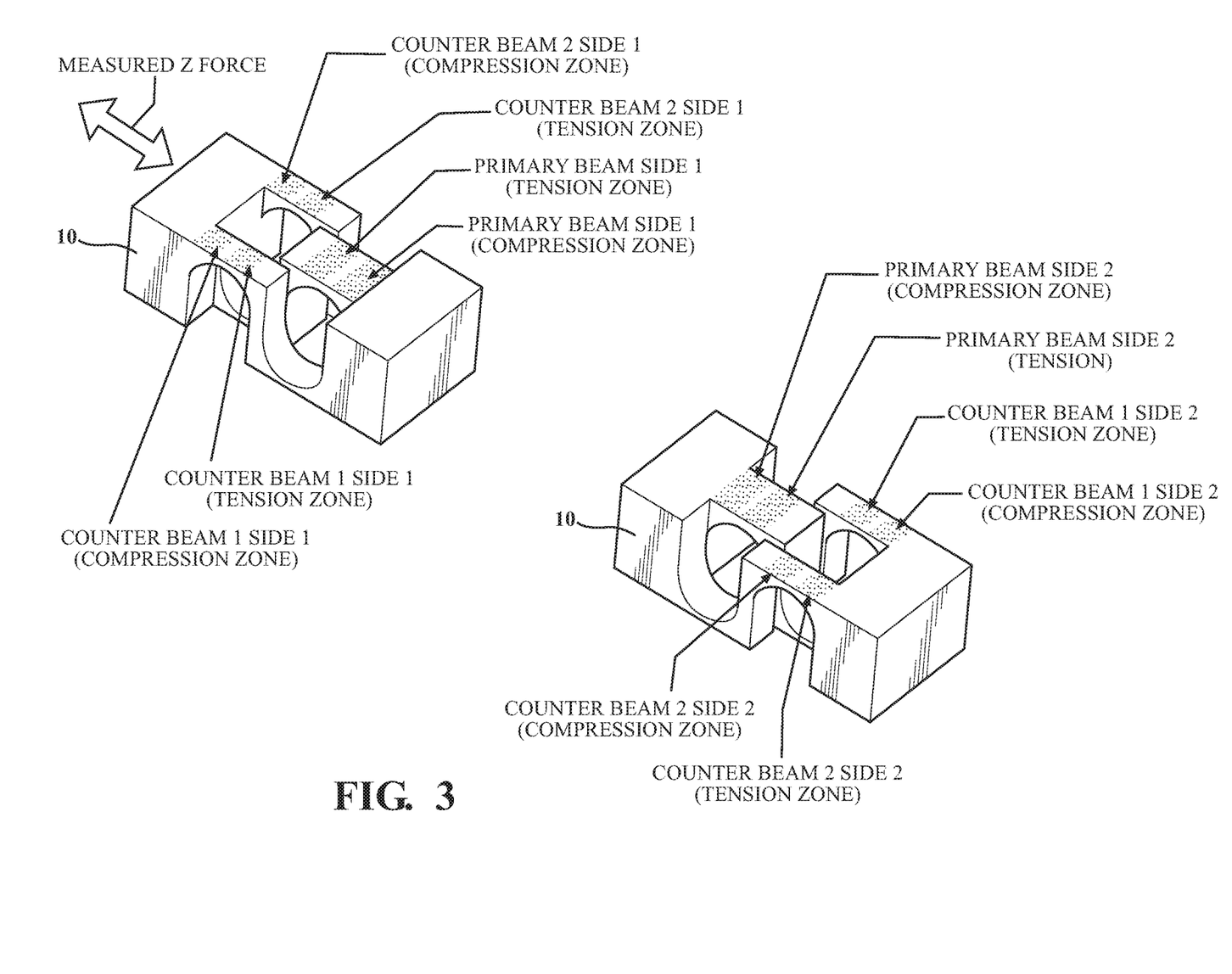
FIG. 3 shows two perspective views of the flexure in tension and compression modes, respectively.

Referring to FIG. 1 through FIG. 3, there is shown a flexure 10 comprising three modified S-shaped flexure beams 12, 14 and 16 arranged in parallel but slightly spaced-apart relationship. All three of the beams are preferably machined from a single piece of metal stock and are integrated at the top by structure 18 and at the bottom by structure 20.

Flexure beams 12 and 16 are hereinafter referred to as "outside" beams and each beam has inwardly curved edge surfaces of the "S" sections oriented east and west; i.e., the upper portions 22 and 24 open to the west whereas the lower portions 26 and 28 open to the east.

The center beam 14, while generally parallel to the outside beams 12 and 16, is oriented exactly opposite to the outside beams in the east-west direction; i.e., the upper curved edge surface 30 of the center beam opens to the east whereas the lower portion 32 opens to the west. In addition, the center beam approximately twice as thick as the outside beams 12 and 16. Of course, the terms "west" and "east" are used here not to show actual geographic direction but to simply show relative directions and other ways of describing this orientation arrangement can be used including, by way of example, plus x and minus x to refer to a horizontal x axis.

All of the beams are configured in such a way as to have flat external edge surfaces 36, 38, 40, 42 and 44 that are the preferred locations for strain-sensing instrumentation.

FIGS. 4A-4D show, by way of example, strain gage resistors T and C mounted on outside edge surfaces of the three beams in "single sided" fashion. No gages are applied to the planar face surfaces between beams. The letter "T" represents gages that are placed on areas that flex in tension while the letter "C" represents areas gaged to flex in compression under the same load. The circuit diagram of FIG. 5 shows a generalized bridge circuit for the single-sided instrumentation and the chart of FIG. 6 shows the matrix of T and C gage locations possible.

Figure 4A:
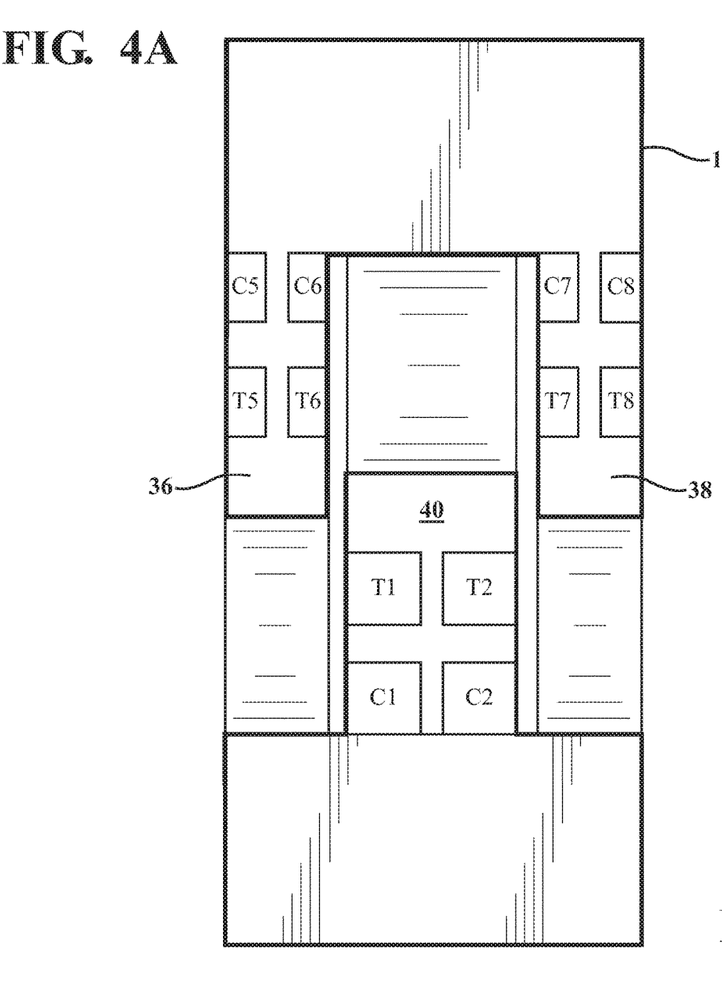
FIGS. 4A-4D show single-sided instrumentation for the flexure.
Figure 4B:
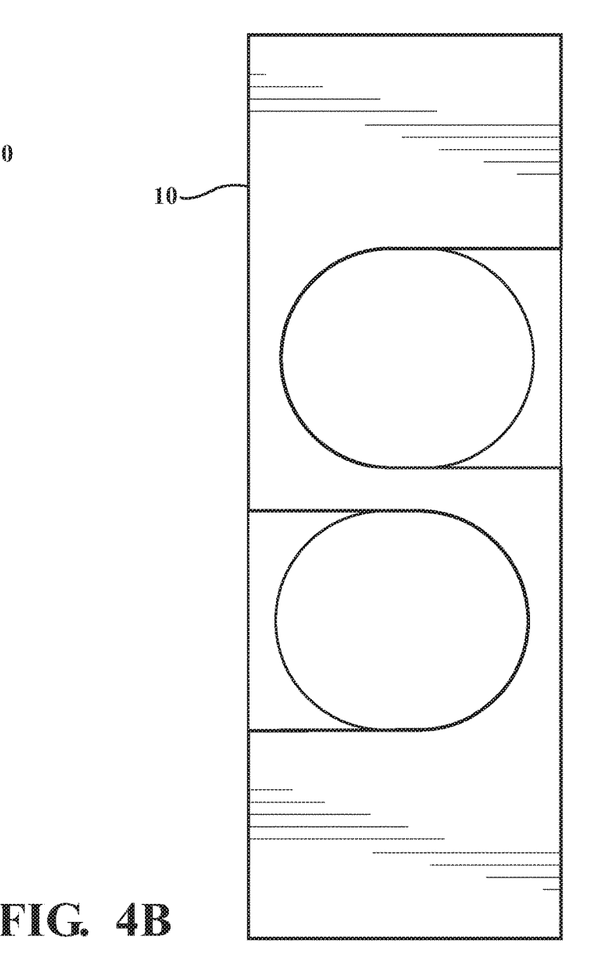
Figure 4C:
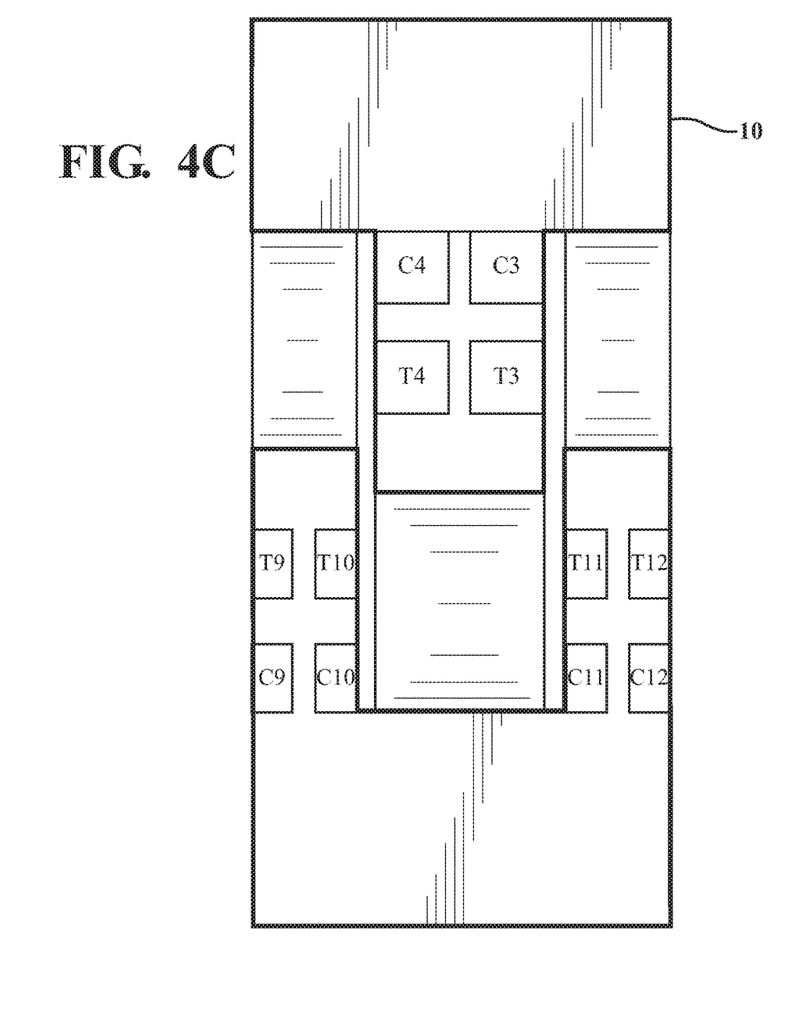
Figure 4D:
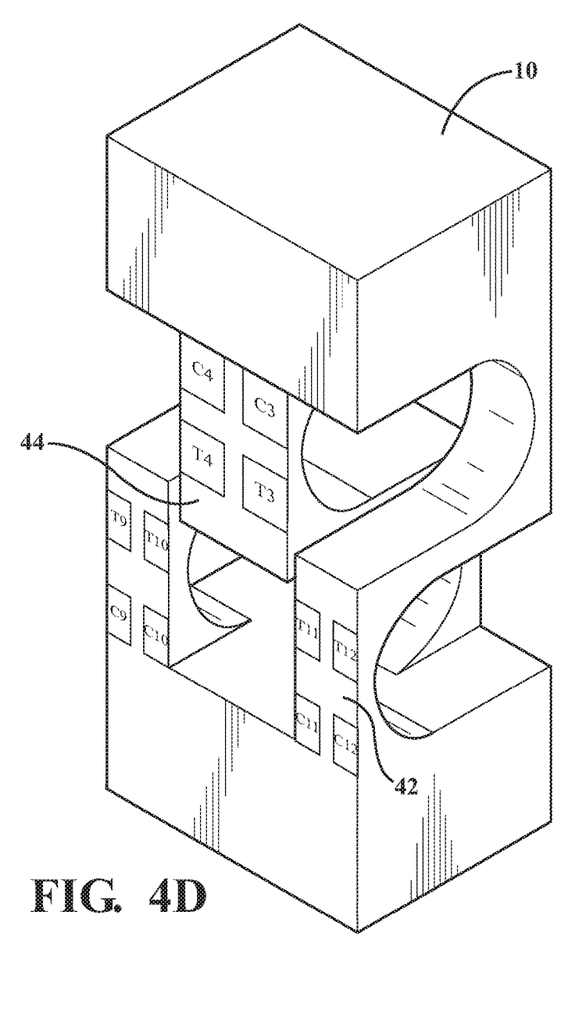
Figure 5:
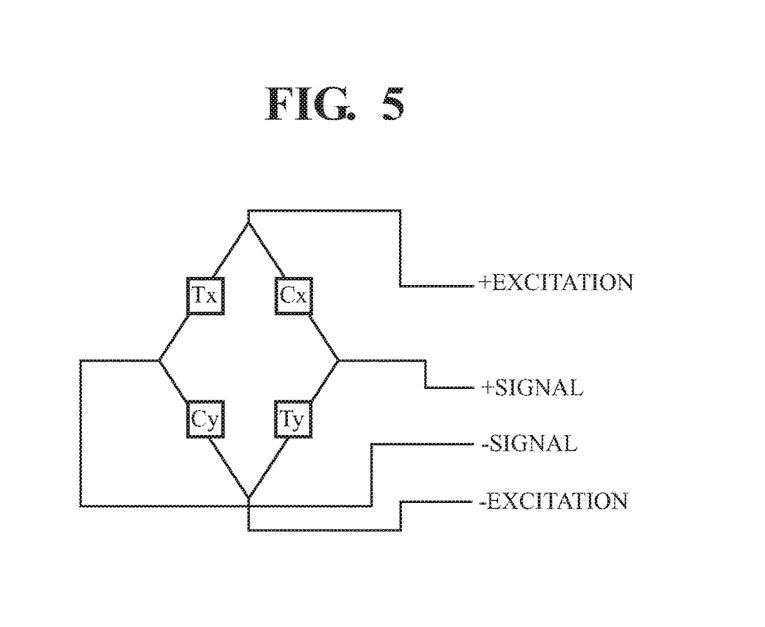
FIG. 5 shows a generalized bridge circuit for the T and C strain gages of FIG. 4.
Figure 6:
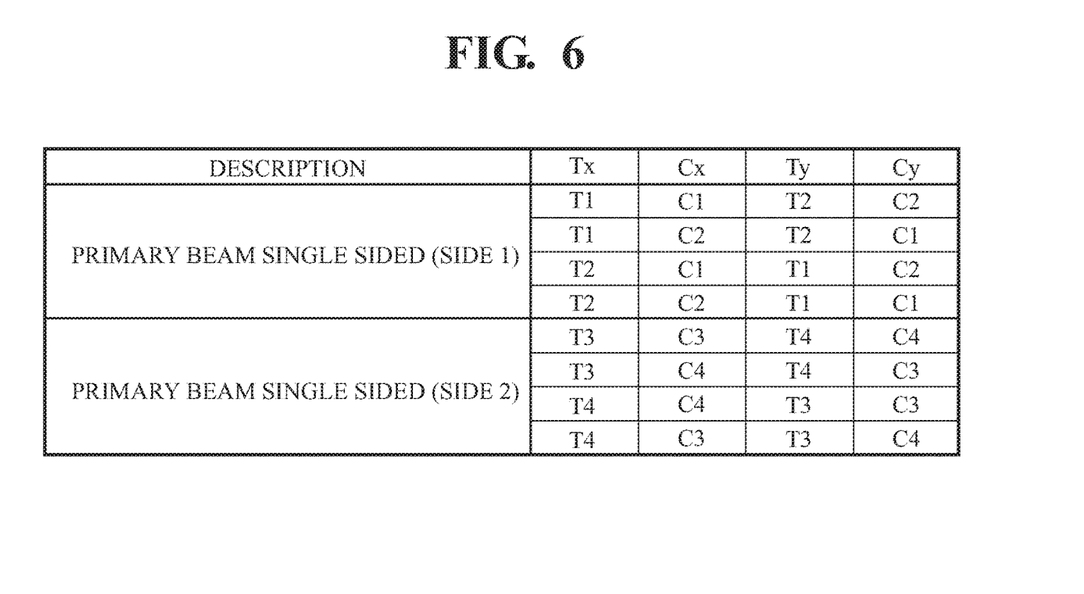
FIG. 6 is a chart showing the matrix of T and C strain gage locations possible for both tension and compression modes.
Figure 7A:
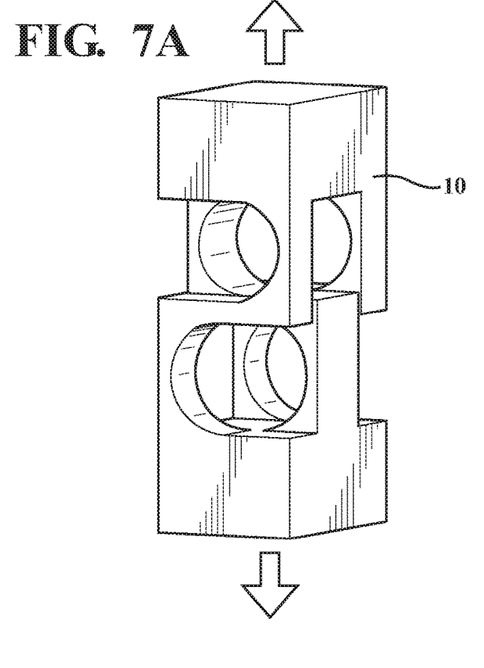
FIGS. 7A-7B show the flexure in tension mode.
Figure 7B:
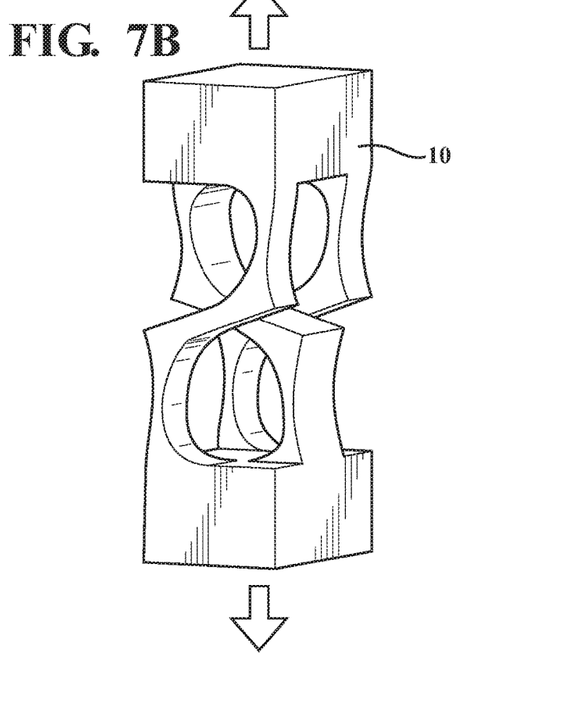
Figure 8A:
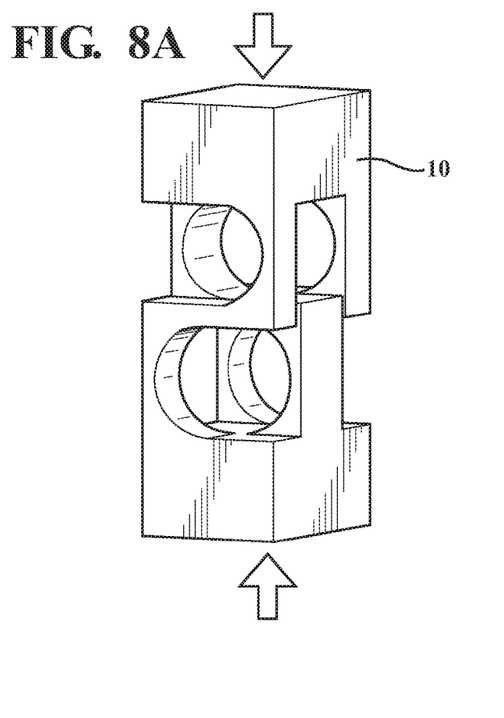
FIGS. 8A-8B show the flexure in compression mode.
Figure 8B:
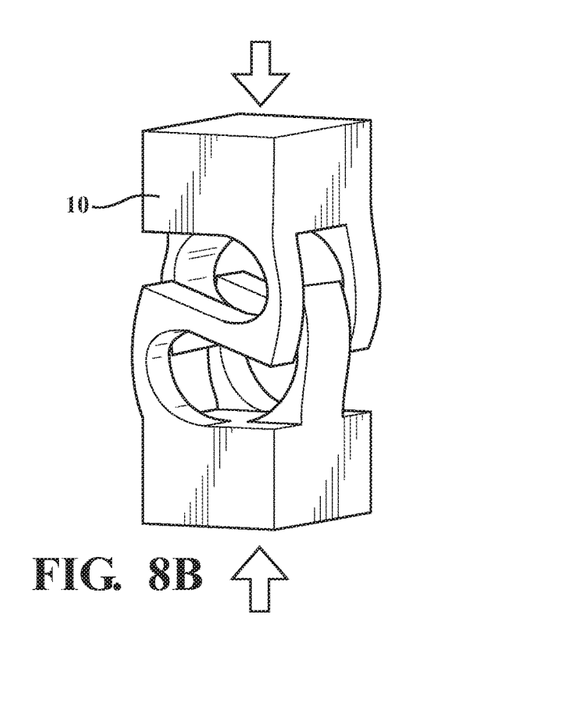
Figure 9:
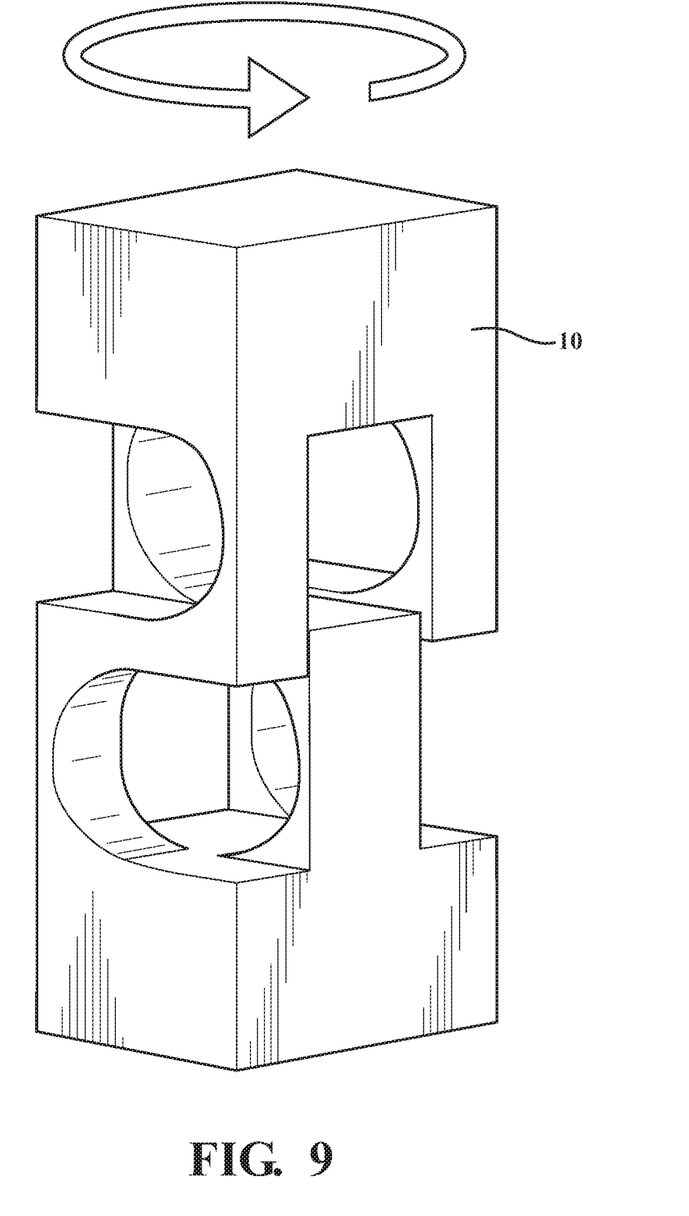
FIG. 9 shows the flexure in torsion mode.
Figure 10A:
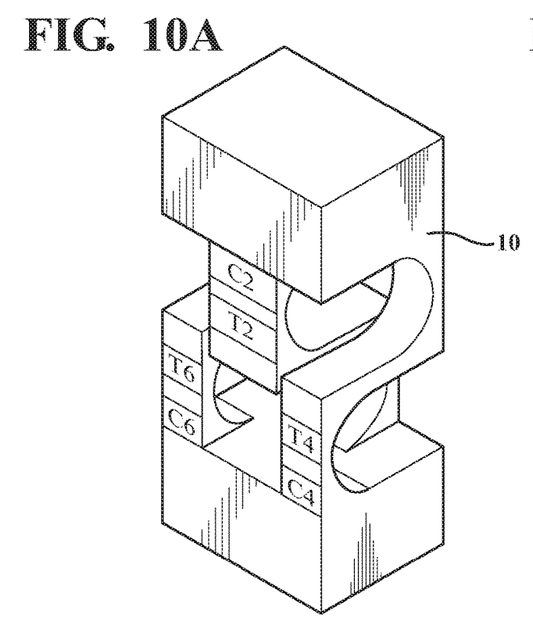
FIG. 10A-10D show double-sided instrumentation.
Figure 10B:
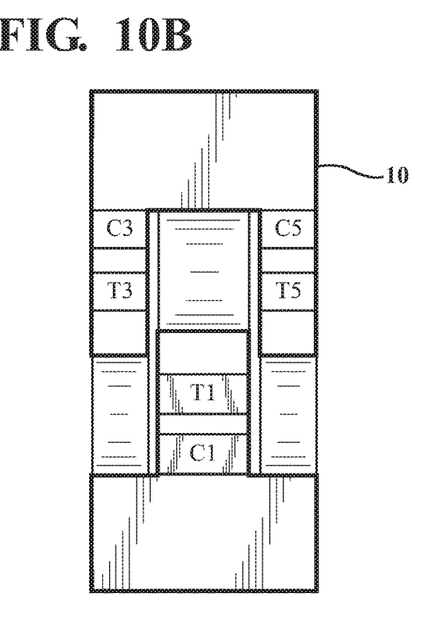
Figure 10C:
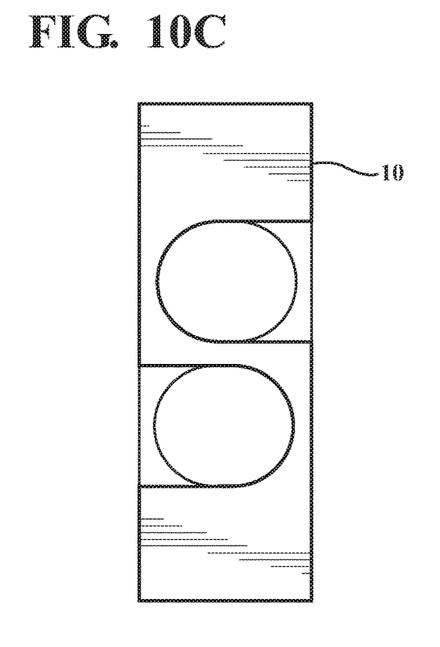
Figure 10D:
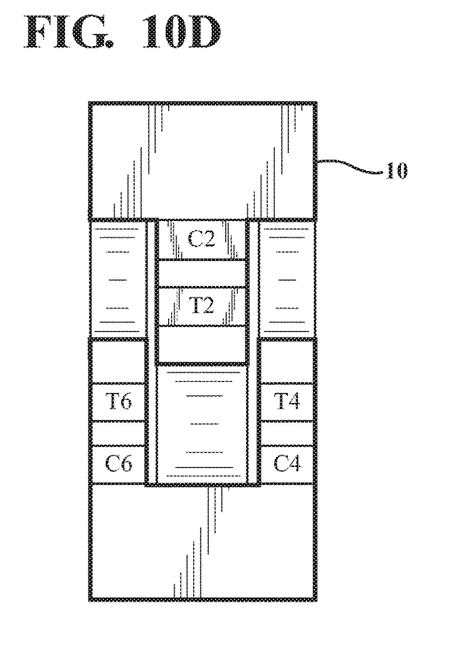
Figure 11A:
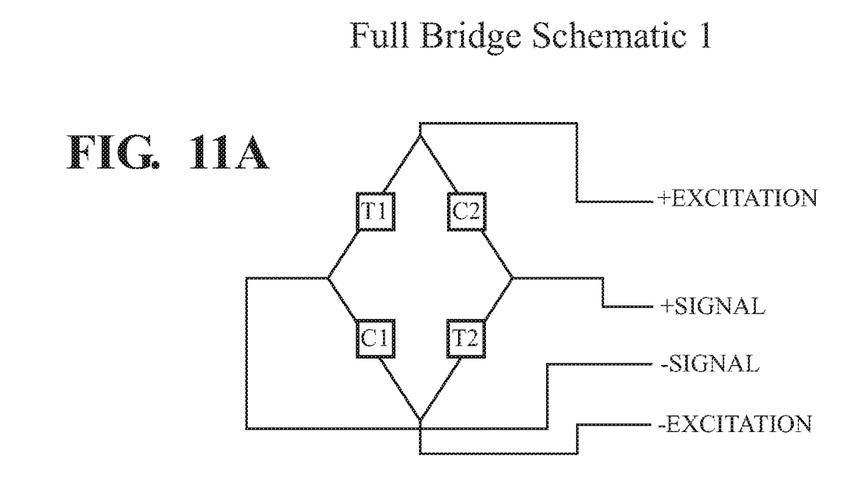
FIGS. 11A-11D show circuit diagrams for the instrumentation of FIG. 10.
Figure 11B:
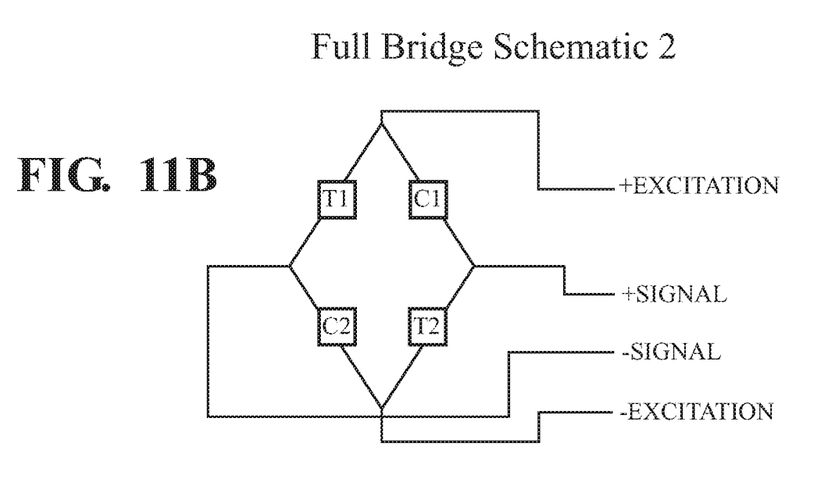
Figure 11C:
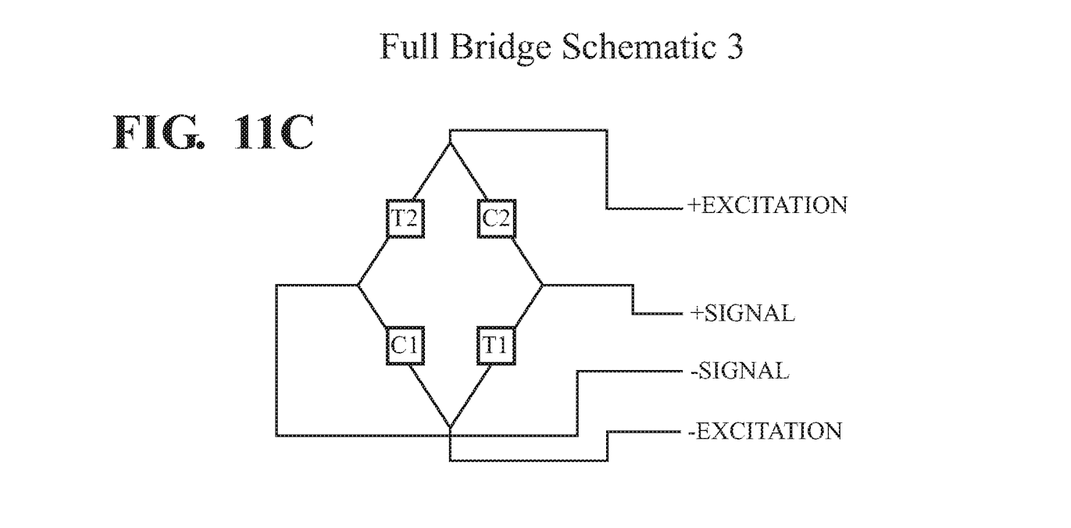
Figure 11D:
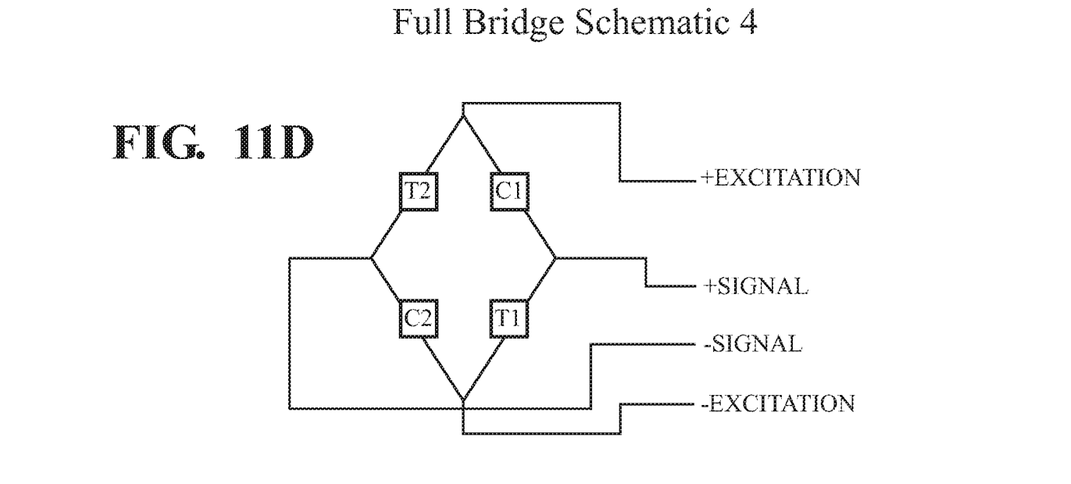

Looking at FIGS. 7A and 7B, applied in tension to the top structure 18 of the flexure 10 distorts the flexure as shown in FIG. 7B (exaggerated) and the strain gages at the areas shown in FIG. 4 respond in to produce an output voltage in the circuit of FIG. 5. When a compression force is applied, the elastic distortion of the flexure is as shown in FIG. 8B and the responses of the strain gage resistors is reversed; i.e., tension-responsive areas become compression responsive and vice-versa.

As will be apparent to those skilled in the art, the strain gages act as variable resistors, the variation in resistance being a function of the degree of distortion or mechanical strain in the strain concentration areas of the flexure 10 to which the gage is applied. The variable resistors are connected into Wheatstone bridge circuits to produce voltages representing the degree of distortion and, by way of proxy, the applied load force. Wheatstone bridge operation is well known.

Referring back to FIGS. 4A-4D and FIG. 5, showing a single-sided instrumentation pattern for the flexure 10, all strain gages are, in this example, mounted only on the flat, planar outside edge surfaces of the beams described with respect to FIG. 2. FIG. 4A shows four gages T1, T2, C1, and C2 mounted in the lower surface 40 of the center beam 14 and eight strain gages on the upper edges of the outside beam surfaces 36 and 38.

The four gages on outside beam 12 are labelled C5, C6, T5, and T6. The gages on the other side of the inside beam 14 are labelled C4, C3, T4, and T3. The circuit diagram of FIG. 5 and the chart of FIG. 6 show how typical bridge circuit schematics can be formed using the labelled resistors, the designators x and y correlating locations to FIG. 5.

Turning now to FIGS. 10 and 11, typical double-sided instrumentation diagrams are given. Again, the labels C1, C2, T1, T2, etc., represent tension and compression sensors on the beams and in the bridge circuits.

Figure 12:
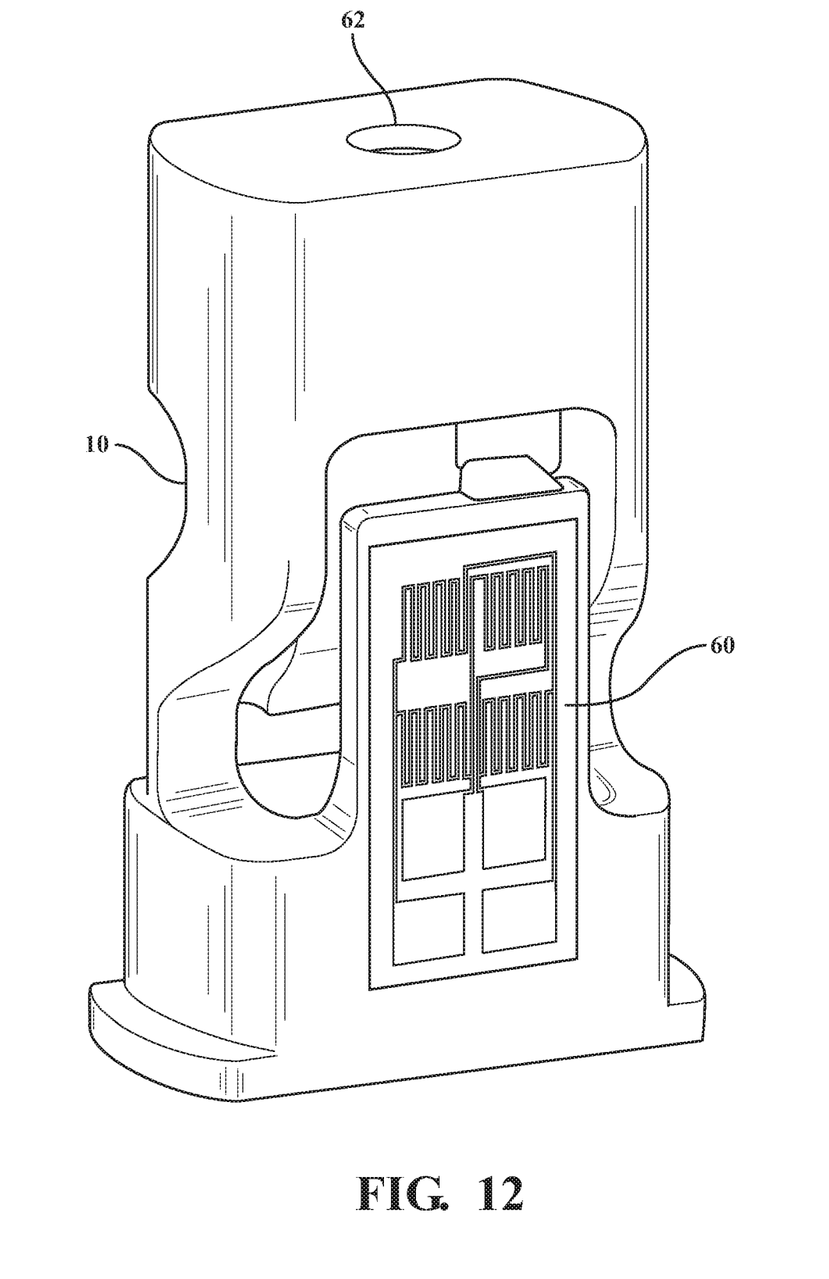
FIG. 12 shows a packaging concept for a commercial product.

FIG. 12 shows a commercial packaging concept for the flexure 10. A circuit board 60 is suitably secured to the lower structure and the lower outside edge surface of the center beam 14. A threaded hole 62 is formed in the top structure to receive a component for transfer to the flexure.

By way of example and not by limitation, a viable flexure measured 0.4 in.×0.18 in.×0.14 in (H×W×D) and used conventional bonded strain gages. A smaller device measured just 0.158 in.×0.118 in.×0.078 in. (H×W×D) and was instrumented with full bridge sensing elements. It will also be appreciated that various means may be used to transmit forces to the flexure; e.g., threaded holes in the top and/or bottom structures, load buttons, and through holes.

With the flexure constrained at the mounting surface, tension or compression force applied perpendicular to the loading surface, result in deflection of the primary center beam in conjunction with the reverse-acting two side beams 12, 16 creating parallel, concentric movement between loading and mounting surfaces of the flexure 10. In this parallel motion of the tripedal flexure, under tension or compression loading, the flexure structure generates 6x highly concentrated strain measurement locations, which can be utilized for strain measurement for force or torque sensing applications.

A unique feature of the tripedal beam is the fact that the three tripedal bending beams 12, 14, and 16 deflect perpendicularly to the load directions. This is due to counter reaction of the side beams against the deflection of the primary center beam 14, resulting in the strain measurement surface region being parallel to the direction of the measured force.

During tension and compression loading, 2× tension and compression strain measurement zones are distributed on each of 3× beam surfaces oriented parallel to the direction of the measured z force. The high density, ultra-compact stress pattern of the tripedal flexure allows for not only highly miniaturized sensor design beyond conventional bending beam capability, but also streamlining and integration of instrumentation processes with, but not limited to, single full bridge gauge design, or printed, deposited strain gauge technology.

While force measurements can be carried out by instrumenting just one side of the primary bending beam in its tension and compression zones for strain delta change under load, the design intent was to allow also for double sided instrumentation of the primary beam for improved performance. In special circumstances the side counter beams can be used for instrumentation to allow for either torque measurements, multi components measurement, or to use to improve off center load capability and sine error cancellation option.

It is to be understood that the invention has been illustrated and described with respect to an illustrative embodiment and the various modifications and changes to the invention may be made without departing from the spirit and scope of the invention as defined by the claims.

What is claimed is:

1. A tripedal flexure comprising the unitary combination of:
   a pair of substantially S-shaped outside beams with reversely curved upper and lower portions with edge surfaces; and
   a single substantially S-shaped center beam having reversely curved upper and lower portions with edge surfaces;
   the upper and lower portions of the outside beams being oriented in the same direction whereas the upper and lower curved portions of the center beam are oriented in the opposite direction;
   the beams being spaced apart from one another along the upper and lower curved portions but integrally joined to form a common top structure and a common base structure; wherein
   each of the beams provides strain concentration areas.

2. The flexure defined in claim 1, further including strain sensing elements applied to at least some of said areas.

3. The tripedal flexure defined in claim 1 wherein each of said outside and center beams has opposite exposed edge surfaces, the exposed edge surfaces of the center beam being oriented opposite to the edge surfaces of the outside beams; the edge surfaces on the inside of the S-portions being curved whereas the edge surfaces on the outside of the S-portions are flat.

4. A tripedal flexure as defined in claim 3 wherein said strain sensing elements are variable resistors applied to said flat edge surfaces.

5. A tripedal flexure as defined in claim 3 wherein all of the flat edge surfaces areas are provided with variable resistance strain sensing devices thereby to allow said flexure to measure all or any of tension forces, compression forces and/or torque.

6. A flexure as defined in claim 1 wherein the flexure is made from a single piece of stock.

7. A force and/or torque sensor comprising:
   three substantially identical S-shaped flexure beams including a center beam oriented east to west and two side beams oriented west to east, all of said beams having outside edge surfaces;
   the three S-shaped beams being arranged parallel to one another and laterally spaced apart but integrated structurally by a common mounting structure on one axial end and a common loading structure on the other axial end;
   the three beams being structurally and flexurally separated from one another other than at the mounting and loading structures; and
   the edge surfaces of one or more of the three beams being instrumented to produce electrical signals when loaded in one or more of tension, compression and torque.

8. The force and/or torque sensor defined in claim 7 wherein the center beam is approximately twice the thickness of the outside beams.

9. A force and/or torque sensor as defined in claim 7 wherein the overall structure has a height on the order of 0.158", a width on the order of 0.118" and a depth on the order of 0.078".

10. A force and/or torque sensor as defined in claim 7 wherein the entire structure is manufactured from a single piece of stock using material selected from the group consisting of stainless steel, Inconel and aluminum.

11. A force and/or torque sensor as defined in claim 7 wherein the edge surfaces consist of flat outside edge surfaces and curved inside edge surfaces on each of the substantially S-shaped flexure beams.

* * * * *